June 5, 1956  G. W. CLINARD  2,748,601
GRAIN MEASURING DEVICE FOR COMBINE
Filed June 9, 1953  2 Sheets-Sheet 1
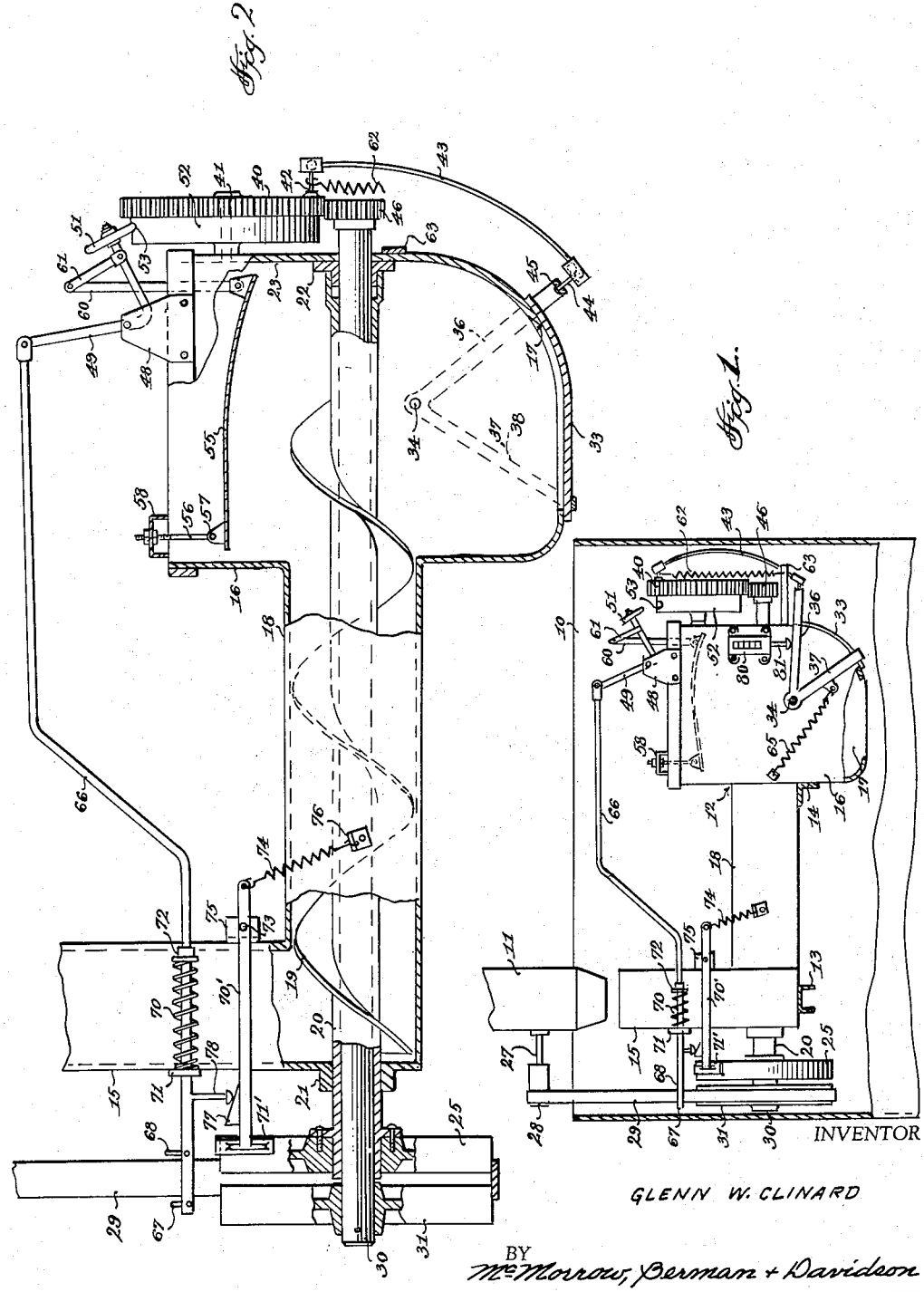
INVENTOR
GLENN W. CLINARD
BY
McMorrow, Berman + Davidson
ATTORNEY June 5, 1956          G. W. CLINARD          2,748,601
GRAIN MEASURING DEVICE FOR COMBINE
Filed June 9, 1953                    2 Sheets-Sheet 2
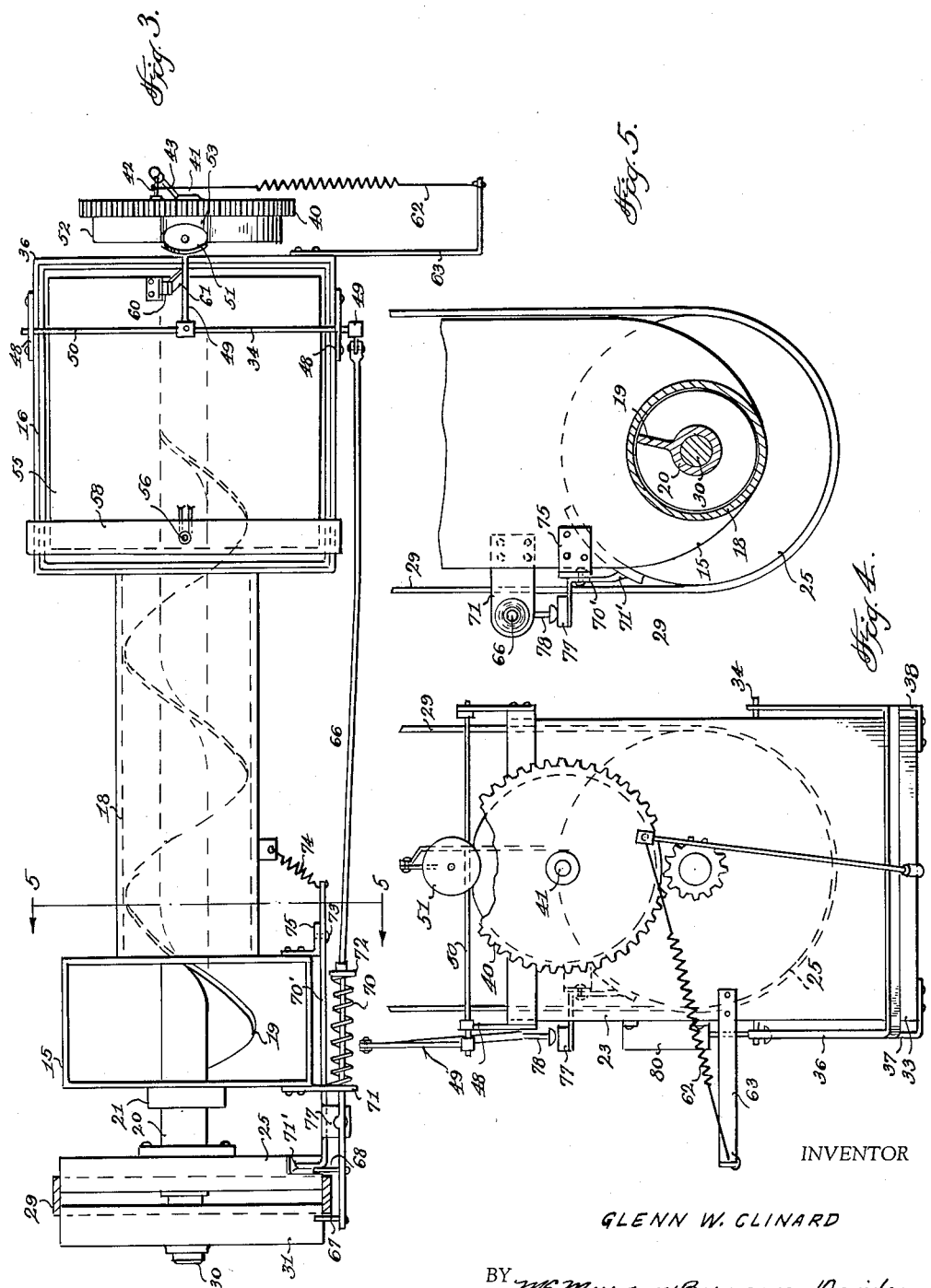
INVENTOR
GLENN W. CLINARD
BY McMorrow, Berman + Davidson
ATTORNEYS united States Patent Office 2,748,601
Patented June 5, 1956

2,748,601

GRAIN MEASURING DEVICE FOR COMBINE

Glenn W. Clinard, Great Falls, Mont.

Application June 9, 1953, Serial No. 360,521

5 Claims. (Cl. 73—223)

This invention relates to grain measuring devices for combines and more particularly to a volume measuring device for measuring and recording the quantity of grain passing from the elevator to the hopper or grain box of the combine.

It is among the objects of the invention to provide a grain measuring device which can be mounted on a grain combine with no material modification of the combine construction and driven by the combine to measure the grain passing from the combine elevator to the hopper or grain box of the combine and record the quantity of grain measured; which is automatically responsive to the volume of grain passing from the elevator to the grain box; which has its own power operated feed means and is free of choking or clogging; and which is simple and durable in construction, economical to manufacture, easy to install, and positive and accurate in operation.

Other objects and advantages will become apparent from a consideration of the following description and the appended claims in conjunction with the accompanying drawings wherein:

Figure 1 is a side elevational view of a grain measuring device illustrative of the invention shown in operative association with the cooperating parts of a grain combine;

Figure 2 is a side elevational view of the grain measuring device on an enlarged scale with portions broken away and shown in cross section to better illustrate the construction thereof;

Figure 3 is a top plan view of the grain measuring device;

Figure 4 is an end elevational view looking at the right-hand end of the device as illustrated in Figure 3; and Figure 5 is a transverse cross sectional view on the line 5—5 of Figure 3.

With continued reference to the drawings, the numeral 10 indicates the grain box of an agricultural combine and the numeral 11 indicates the discharge end portion of the elevator of the combine which elevates the grain from the discharge auger below the threshing mechanism of the combine into the top of the grain box 10 from which the grain is discharged at intervals into trucks or wagons which carry the threshed grain away from the combine.

As grain elevators are old and well known to the art, and as the device of the invention can be applied to various types of combines, a more detailed illustration and description of the combine construction is considered unnecessary for the purposes of the present disclosure.

The grain measuring device, generally indicated at 12, is mounted in or on the upper portion of the combine grain box 10 by suitable brackets 13 and 14 and embodies a sheet metal housing having at one end a receiver 15 of rectangular shape disposed with its open top end immediately below the discharge end of the grain elevator 11 to receive the grain from the elevator, a hopper 16 at the other end of the housing provided with a bottom discharge opening 17 through which the grain is periodically discharged into the grain box 10 and a duct 18 of circular cross sectional shape extending between the receiver 15 and the hopper 16 and connected at one end to the receiver at the bottom of the receiver and at its other end to the hopper intermediate the height of the hopper.

An auger 19 having a tubular central shaft 20 extends through the bottom portion of the receiver 15, through the duct 18 and into the hopper 16 and is journaled near one end in a bearing boss 21 on the outer end wall of the receiver 15 and at its other end on a bearing boss 22 mounted on the inner side of the outer end wall 23 of the hopper 16. A belt pulley 25 is mounted on the auger shaft 20 at the end of this shaft projecting outwardly from the outer side of the receiver 15, an elevator driven shaft 27 projects outwardly from the elevator duct 11 near the discharge end of this duct, and carries on its end a belt pulley 28 materially smaller than the belt pulley 25.

A belt 29 drivingly connects the belt pulley 28 to the belt pulley 25. A shaft 30 extends through and is journaled in the tubular shaft 20 of the auger 19 and projects at its ends outwardly of the corresponding ends of the auger shaft. A belt pulley 31 of the same size as the pulley 25 is mounted on the end of the shaft 30 at the outer side of the pulley 25 and is also engaged by the belt 29, this pulley 31 and the shaft 30 being continuously driven while the auger driving pulley 25 is periodically driven in response to operation of grain measuring control means presently to be described.

A transversely curved gate 33 is mounted on the hopper 16 by a pivot rod 34 extending transversely through the hopper and by brackets 36, 37 and 38, secured to the gate at locations spaced apart therealong and converging to the pivot rod 34 at respectively opposite sides of the hopper, the brackets being provided at their convergent ends with apertures through which the end portions of the pivot rod 34 projecting outwardly of the sides of the hopper extend.

A spur gear 40 is mounted on the outer side of the outer end wall 23 of the hopper 16 by an axle 41 secured at one end to the end wall 23 and projecting outwardly therefrom and a pin 42 is mounted on the gear 40 eccentrically of the axle 41 and projects outwardly from the gear. A curved link 43 is connected at one end to the outer end of the pin 42 and at its other end to the outer end of a pin 44 projecting outwardly from the intermediate portion 45 of the bracket 36, a lost motion connection being provided between the pin 44 and the corresponding end of the link 43. A spur gear 46, smaller than the gear 40, is mounted on the end of the shaft 30 adjacent the gear 40 to mesh with the teeth of the gear 40, but the gear 40 is a mutilated gear having a sufficient number of teeth missing, so that the gear 46 can rotate without rotating the gear 40 when the gear 40 is in a predetermined rotational position.

A bracket 48 is mounted on one of the side walls of the hopper 16 and projects upwardly above the hopper and a bell crank lever 49 is pivotally mounted intermediate its length on this bracket by a pivotal connection, as indicated at 50. A roller 51 is journaled on one end of the bell crank lever 49 and the gear 40 is provided, at the side thereof adjacent the hopper end wall 23, with a cam formation 52 having a dwell 53 therein which releasably receives the roller 51 and holds the gear 40 in the above described predetermined rotational position, so that the gear 46 can rotate without rotating the gear 40 while the roller 50 is in the cam dwell 53.

A pressure plate 55 is mounted in and extends transversely of the upper portion of the hopper 16 above the auger 19 and is pivotally mounted at one end on the hopper by means of a shaft 56 pivotally connected at its lower end to the pressure plate 55, as indicated at 57, and adjustably mounted on its upper end on a bar 58 that extends transversely of the hopper, so that the pressure plate 50 can be adjustably raised and lowered to calibrate the grain measuring mechanism to discharge a predetermined quantity of grain at each opening of the gate 33.

Links 60 and 61 connect the pressure plate 55 at its end remote from the pivotal connection 57 to the leg of the bell crank lever 49 carrying the roller 51, so that when the pressure plate 55 is raised by the predetermined pressure of grain fed into the hopper 16 by the auger 19, the roller 51 will be lifted out of the dwell 53 in the cam formation 52 on the gear 40. A tension spring 62 is connected between the pin 42 and the distal end of a bracket 63 mounted on the outer side of the end wall 23 of the hopper and projecting laterally therefrom and, when the roller 51 is lifted out of the cam dwell 53 this spring 62 turns the gear 40 an amount sufficient to bring the teeth of the gear 40 into mesh with the teeth of the continuously rotating gear 46. The gear 46 will now turn the gear 40 through one complete rotation until the roller 51 again drops into the dwell 53 and during this rotation of the gear 40 the gate 33 will be moved from its position closing the discharge opening 17 in the bottom of the hopper 16 to a position in which the discharge opening is fully opened and will then return the gate to its position closing the discharge opening. When the discharge opening 17 is opened by the opening movement of the gate 33, the grain in the hopper will fall from the hopper through the discharge opening 17 into the associated grain box and the pressure on the pressure plate 55 will be relieved, permitting the roller 51 to descend and engage in the cam dwell 53 when this dwell again reaches the location of the roller. The gear 40, cam formation 52 and roller 51 thus together constitute a one-rotation clutch which is effective to open and close the discharge gate 33 each time the pressure plate 55 is subjected to a predetermined pressure of the grain in the hopper. A tension spring 65 connected between the bracket 37 and the side of the hopper 16 resiliently urges the gate 33 toward its hopper closing position and the lost motion connection between the link 43 and the pin 44 gives to the wheel 40 a sufficient degree of relatively free movement to permit the spring 42 to rotate the gear wheel 40 to bring its teeth into mesh with the gear 46 before the application of sufficient force to the link 43 to move the gate 33.

A rod 66 is connected at one end to the end of the bell crank lever 49 remote from the roller 51 and this rod extends from the bell crank lever 49 to the location of the belt 29 and carries pins 67 and 68 disposed at respectively opposite sides of one run of the belt 29. A compression spring 70 surrounds a portion of the shaft 66 and bears at one end against a bracket 71 mounted on the receiver 15 of the grain measuring mechanism and having an aperture therein slidably receiving the shaft and at its other end against an abutment collar 72 mounted on the shaft at a location spaced from the bracket 71. The spring 70 applies a resilient force to the shaft or rod 66 in a direction to force the pressure plate 55 downwardly in the hopper and the force exerted by this spring can be adjusted by moving the abutment collar 72 along the shaft 66.

When the pressure of the grain in the hopper on the pressure plate 55 exceeds the force exerted on the pressure plate by the spring 70, the pressure plate is raised and the gate 33 is opened and closed in the manner described above. At the same time, the shaft 66 is moved in a direction to move the belt 29 off of the belt pulley 25, so that the auger 19 will be stopped during the time that the discharge gate 33 is being opened and closed and grain will not be fed into the hopper while the contents of the hopper are being discharged.

In order to insure that the auger 19 does not rotate during the discharge of the hopper, a suitable brake is applied to the belt pulley 25.

The brake for the belt pulley 25 comprises a bar 70' pivotally mounted intermediate its length on a bracket 75 mounted on the receiver 15, the bar being mounted on the bracket by the pivotal connection 73. A brake shoe 71' is mounted on one end of the bar 70 and is frictionally engageable with the peripheral surface of the pulley 25, and a tension spring 74 connected between the end of the bar 70' remote from the pulley 25 and a bracket 76 mounted on the duct 18 to hold the brake shoe 71' out of engagement with the pulley 25. A cam 77 is mounted on the bar adjacent the end of the bar carrying the brake shoe 71' and a cam follower 78 is carried by the shaft 66 and engages the cam 77 to force the brake shoe into frictional engagement with the pulley 25 when the shaft 66 moves to force the belt 29 off of the pulley 25.

As soon as the pressure plate 15 is lowered by the discharge of the grain from the hopper 16, and the door 33 is closed by the rotation of the pulley 40, the cam dwell 53 will be brought back into registry with the roller 51 and the spring 70 can then move the shaft 60 in a direction to seat the roller 51 in the dwell 53 and also release the brake shoe 71' from the pulley 25 and move the belt 29 back into engagement with this pulley, so that operation of the auger 19 will be resumed.

A counter 80 is mounted on the hopper 16 and has a projecting lever 81 which is engaged by the discharge door bracket 36 each time this door is moved to a position to open the discharge opening 17 in the bottom of the hopper. The counter will thus keep a record of the number of times that the hopper is dumped and as a predetermined quantity of grain will be accumulated in the hopper before each dumping of the hopper, an accurate measure of the amount of grain threshed will be provided.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. A grain measuring mechanism comprising a grain receiver adapted to be disposed under the discharge end of a combine elevator to receive grain therefrom, a hopper having a discharge opening, a duct connecting said receiver to said hopper, a tubular auger extending from said receiver through said duct into said hopper, a shaft extending through said auger, means driving said shaft and said auger, a gate mounted on said hopper for movement into and out of closing relationship with said discharge opening, a pressure plate mounted in said hopper and movable in response to the pressure of grain forced into said hopper by said auger, means driven by said shaft and including a one-rotation clutch mechanism effective to open and close said gate, means actuated by said pressure plate when subjected to a predetermined pressure of the grain in said hopper to disconnect said driving means from said auger and to trip said clutch means and to reconnect said driving means to said auger upon the completion of a single rotation by said clutch means, and counter means responsive to the opening and closing of said gate indicating a total of the number of discharges of grain from said hopper.

2. A grain measuring device adapted to be mounted on a combine grain box to receive grain from the combine elevator and periodically dump the grain from the elevator into the grain box comprising a housing including a receiver, a hopper having a discharge opening therein and a duct connecting said receiver to said hopper, a tubular auger extending through said duct from said receiver into said hopper, a shaft extending through said auger, means driving said auger and said shaft, a gate mounted on said hopper for movement into and out of closing relationship to said discharge opening, a pressure plate in said hopper and movable in response to the pressure of grain forced into said hopper by said auger, means driven by said shaft and controlled by said pressure plate to open and close said gate each time the grain in said hopper exerts a predetermined pressure against said pressure plate, means resisting movement of said pressure plate by the grain in said hopper, means actuated by said pressure plate to discontinue operation of said auger while said gate is opening and closing, and counter means responsive to the opening and closing of said gate to indicate a total of the number of times said gate opens and closes.

3. A grain measuring device adapted to be mounted on a combine grain box to receive grain from the combine elevator and periodically dump the grain from the elevator into the grain box comprising a housing including a receiver, a hopper having a discharge opening therein and a duct connecting said receiver to said hopper, a tubular auger extending through said duct from said receiver into said hopper, a shaft extending through said auger, means driving said auger and said shaft, a gate mounted on said hopper for movement into and out of closing relationship to said discharge opening, a pressure plate in said hopper and movable in response to the pressure of grain forced into said hopper by said auger, means driven by said shaft and controlled by said pressure plate to open and close said gate each time the grain in said hopper exerts a predetermined pressure against said pressure plate, means resisting movement of said pressure plate by the grain in said hopper, means actuated by said pressure plate to discontinue operation of said auger while said gate is opening and closing, and counter means responsive to the opening and closing of said gate to indicate a total of the number of times said gate opens and closes, said means driven by said shaft and controlled by said pressure plate comprising one-rotation clutch means effective to discontinue operation of said gate after each dumping of said hopper until said hopper is refilled.

4. A grain measuring device adapted to be mounted on a combine grain box to receive grain from the combine elevator and periodically dump the grain from the elevator into the grain box, comprising: a hopper, an auger extending to the hopper for feeding grain thereto, a normally closed gate on the hopper adapted when opened to discharge from the hopper grain accumulating therein, a normally idle gate-opening mechanism connected to said gate, a plate in the hopper deflecting under pressure exerted thereagainst by an excess of grain accumulating in the hopper, counter means responsive to the opening and closing of said gate indicating a total of the number of discharges of grain from said hopper, a shaft extending through the auger and rotatable independently thereof, a driving connection between the shaft and said mechanism adapted for converting rotary motion of the shaft to a gate-opening motion of said mechanism, said connection including a normally disengaged clutch, means extending between the plate and clutch effective to engage the clutch in response to deflection of the plate, a common drive means for the shaft and auger, and means extending between the plate and said common drive means adapted for shifting said drive means out of driving relation to the auger responsive to said deflection of the plate.

5. A grain measuring device adapted to be mounted on a combine grain box to receive grain from the combine elevator and periodically dump the grain from the elevator into the grain box, comprising: a hopper, an auger extending to the hopper for feeding grain thereto, a normally closed gate on the hopper adapted when opened to discharge from the hopper grain accumulating therein, a normally idle gate-opening mechanism connected to said gate, a plate in the hopper deflecting under pressure exerted thereagainst by an excess of grain accumulating in the hopper, counter means responsive to the opening and closing of said gate indicating a total of the number of discharges of grain from said hopper, a shaft extending through the auger and rotatable independently thereof, a driving connection between the shaft and said mechanism adapted for converting rotary motion of the shaft to a gate-opening motion of said mechanism, said connection including a normally disengaged clutch, means extending between the plate and clutch effective to engage the clutch in response to deflection of the plate, a common drive means comprising a pair of side by side pulleys one secured to the auger and one secured to the shaft, said drive means further including a belt trained about said pulleys, and means extending between the plate and said common drive means adapted for shifting the belt out of driving relationship to the auger-attached pulley responsive to said deflection of the plate, said last named means comprising a rod extending transversely of the belt and having a connection at one end to the plate adapted for shifting the rod transversely of the belt responsive to said deflection of the pressure plate, said last named means further including pins secured to the rod at opposite sides of the belt, for shifting the belt with the rod on said deflection of the plate, out of engagement with the auger-attached pulley.

References Cited in the file of this patent
UNITED STATES PATENTS

| | | |
|---|---|---|
| 632,253 | Dentler | Sept. 5, 1899 |
| 1,931,985 | Harrison | Oct. 24, 1933 |
| 2,335,364 | Slaubaugh | Nov. 30, 1943 |